(12) United States Patent
Lubawy

(10) Patent No.: US 8,025,077 B2
(45) Date of Patent: Sep. 27, 2011

(54) MECHANICAL FUSE TO SEAL PIPES UPON UNINTENDED RUPTURE

(75) Inventor: Andrea Leigh Lubawy, Sacramento, CA (US)

(73) Assignee: Toyota Motor Engineering & Manufacturing North American, Inc., Erlanger, KY (US)

( * ) Notice: Subject to any disclaimer, the term of this patent is extended or adjusted under 35 U.S.C. 154(b) by 769 days.

(21) Appl. No.: 12/128,424

(22) Filed: May 28, 2008

(65) Prior Publication Data

US 2009/0293964 A1    Dec. 3, 2009

(51) Int. Cl.
    *F16K 15/03* (2006.01)
(52) U.S. Cl. .................. 137/518; 137/499; 137/521
(58) Field of Classification Search .................. 137/459, 137/460, 497, 499, 517, 518, 521
    See application file for complete search history.

(56) References Cited

U.S. PATENT DOCUMENTS

| | | | |
|---|---|---|---|
| 594,727 A * | 11/1897 | Cooper | 137/521 |
| 1,393,204 A | 10/1921 | Daggett | |
| 2,491,104 A * | 12/1949 | Garrison | 137/460 |
| 3,053,275 A | 7/1959 | Waterfill | |
| 3,561,725 A | 2/1971 | Torres | |
| 3,684,013 A * | 8/1972 | Brown | 137/517 |
| 3,752,181 A * | 8/1973 | Morris et al. | 137/375 |
| 3,905,390 A | 9/1975 | Pysh | |
| 3,967,642 A * | 7/1976 | Logsdon | 137/499 |
| 4,091,835 A * | 5/1978 | Frampton | 137/499 |
| 4,222,408 A | 9/1980 | Slaughter, Jr. | |
| 4,590,962 A * | 5/1986 | Tespa | 137/460 |
| 5,406,977 A * | 4/1995 | Barbarin et al. | 137/499 |
| 5,992,451 A * | 11/1999 | Chang | 137/521 |
| 7,114,519 B2 | 10/2006 | Aitchison et al. | |
| 7,582,009 B1 * | 9/2009 | Cote | 454/264 |
| 2003/0140968 A1 * | 7/2003 | Chang | 137/521 |

OTHER PUBLICATIONS

"Air Fuse In-Line Excess Flow Shut Off Valve" by Norgren, Technical Information, Nov. 1997, N/AL 10.7.001.01, 5 Pages.

* cited by examiner

*Primary Examiner* — John Rivell
(74) *Attorney, Agent, or Firm* — Snell & Wilmer L.L.P.

(57) ABSTRACT

The present invention relates to a mechanical fuse to seal pipes upon unintended rupture. When a pressure difference between a first pressure and a second pressure in a pipe is below a pressure threshold, a first spring retains a flap in a first position allowing gaseous fuel to flow from a first portion to a second portion and when the pressure difference between the first pressure and the second pressure is not below the pressure threshold the flap moves to a second position preventing the gaseous fuel from flowing from the first portion to the second portion.

19 Claims, 1 Drawing Sheet

MECHANICAL FUSE TO SEAL PIPES UPON UNINTENDED RUPTURE

BACKGROUND

1. Field

The present invention relates to a mechanical fuse to seal pipes upon unintended rupture.

2. Background

Automobiles utilize hoses or pipes to carry a variety of fluids (e.g., fuels) to power their engines. However, when an automobile is an accident, the pipe could rupture spilling the fuel into an external environment. This could be problematic because the fuel is explosive, can be detrimental to the environment, could contain harmful vapors to passengers in the automobile, rescue workers, or bystanders, and furthermore could be extremely difficult to detect. This may be particularly true in vehicles which utilize gaseous fuels to power the engine, since gaseous fuels may be hard to detect as they may be clear and/or odorless.

In an accident, however, the passengers are often injured and every second could be critical to the safety of the passengers or the reduction of harm done to the passengers. In the accident, rescue workers could be hampered by the fear and necessity to extend extra precautions to prevent the rupture of the pipe to prevent the fuel from escaping or observe that the pipe has already ruptured and that fuel is escaping. Furthermore, the rescue workers could also be afraid of intentionally rupturing the pipe even when rupturing the pipe would reduce the amount of time necessary to rescue the passengers since the fuel would escape from the automobile.

While electronic sensors may be used to detect the rupture of the pipe in the automobile, electronic sensors may not always be accurate and furthermore may fail during the accident since electrical connections could be damaged.

Thus, there is a need for a reliable fuse which can function without electricity to prevent fuel from escaping into the environment when the pipe has been ruptured.

SUMMARY

In one embodiment, the present invention is a mechanical fuse to prevent an unexpected leakage of a gaseous fuel in an automobile including a pipe with an outer wall, an inner wall defining a hollow cavity which allows the gaseous fuel to flow through the pipe, a first portion having a first pressure, and a second portion having a second pressure, wherein the gaseous fuel flows from the first portion to the second portion. The present invention can also include, a first hinge located in the hollow cavity and attached to the inner wall, a first spring located in the hollow cavity and attached to the inner wall, and a first flap located in the hollow cavity and connected to the first hinge and the first spring, wherein when a pressure difference between the first pressure and the second pressure is below a pressure threshold, the first spring retains the first flap in a first position allowing the gaseous fuel to flow from the first portion to the second portion and when the pressure difference between the first pressure and the second pressure is not below the pressure threshold the first flap moves to a second position preventing the gaseous fuel from flowing from the first portion to the second portion.

In one embodiment, the present invention is a mechanical fuse to prevent an unexpected leakage of a gaseous fuel in an automobile including a pipe having an outer wall, an inner wall defining a hollow cavity which allows the gaseous fuel to flow through the pipe, a first portion having a first pressure, and a second portion having a second pressure, wherein the gaseous fuel flows from the first portion to the second portion. The present invention can also include a first hinge located in the hollow cavity and attached to the inner wall, a first spring located in the hollow cavity and attached to the inner wall, a first flap located in the hollow cavity and connected to the first hinge and the first spring, the first flap comprising a material resistant to hydrogen embrittlement, a second hinge located in the hollow cavity and attached to the inner wall, a second spring located in the hollow cavity and attached to the inner wall, and a second flap located in the hollow cavity and connected to the second spring, the second flap comprising a material resistant to hydrogen embrittlement, wherein when a pressure difference between the first pressure and the second pressure is below the pressure threshold, the first spring retains the first flap in the first position and the second spring retains the second flap in the first position allowing the gaseous fuel to flow from the first portion to the second portion and when the pressure difference between the first pressure and the second pressure is not below the pressure threshold the first flap and the second flap move to the second position, the first flap and the second flap cooperate with each other to prevent the gaseous fuel from flowing from the first portion to the second portion, and the first pressure aids in maintaining the first flap and the second flap in the second position.

In one embodiment, the present invention is a method for preventing an unexpected leakage of a gaseous fuel in an automobile including the steps of flowing the gaseous fuel from a first portion of a pipe to a second portion of the pipe, placing a first flap and a second flap in a first position in the pipe, increasing an angle of attack in the first flap and the second flap when a pressure difference between the first pressure and the second pressure is above a predetermined threshold, placing the first flap and the second flap in a second position in the pipe, using the first pressure to maintain the first flap and the second flap in the second position, and preventing the gaseous fuel from flowing from the first portion to the second portion.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
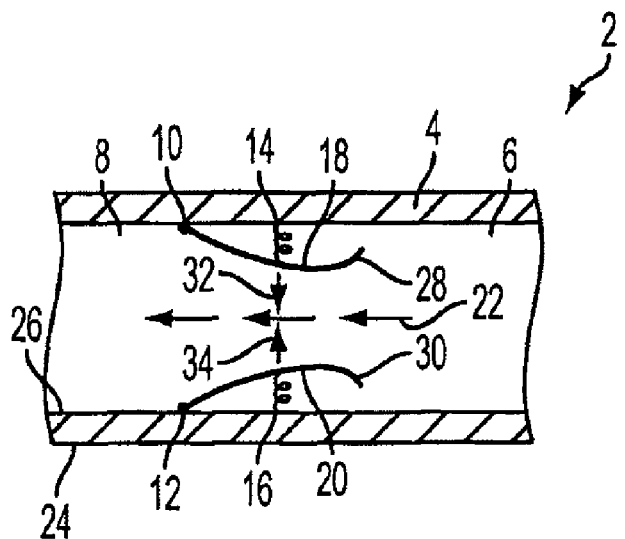
FIG. 1 is a side view of a mechanical fuse positioned within a pipe according to an embodiment of the present invention.
Figure 2:
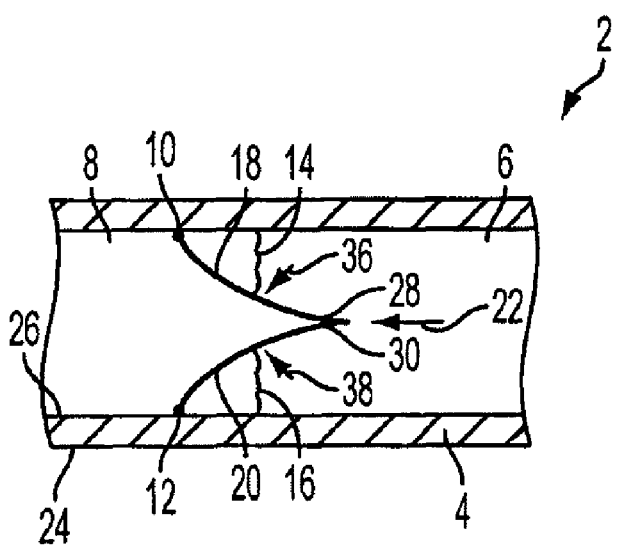
FIG. 2 is a side view of a mechanical fuse positioned within a pipe according to an embodiment of the present invention.

FIGS. 1 and 2 are side views of mechanical fuses within a pipe according to an embodiment of the present invention. As seen in FIGS. 1 and 2, a mechanical fuse 2 is positioned within a pipe 4 and includes a first hinge 10, a second hinge 12, a first spring 14, a second spring 16, a first flap 18, and a second flap 20. Even though first flap 18 and second flap 20 are shown, mechanical fuse 2 preferably has 3 or 4 curved triangular shaped flaps that partially overlap to seal the pipe 4. Therefore, mechanical fuse 2 can have 3 or 4 hinges and 3 or 4 springs. The flaps may also be referred to as foils. When closed, the flaps may be formed in the shape of a flower or a pyramid.

Pipe 4 includes a first portion 6, a second portion 8, an outer surface 24, and an inner surface 26. Pipe 4 can be made of a metallic material or a plastic material. Pipe 4 can also comprise a material that is substantially resistant to hydrogen embrittlement. In one embodiment, pipe 4 is substantially rigid and may have 3 or 4 sides such that each flap is attached to one side of pipe 4. Pipe 4 can also be of any sized diameter capable of carrying gaseous fuel 22 or any other type of fluid such as oil.

Inner surface 26 defines a hollow cavity which allows gaseous fuel 22 to flow from first portion 6 to second portion 8. In one embodiment, gaseous fuel 22 is hydrogen fuel, while in another embodiment, natural gas. However, it is understood that gaseous fuel 22 can be any sort of fuel that is suitable to power an engine. Although not shown, it is contemplated that gaseous fuel 22 can instead be a liquid fuel such as gasoline or ethanol.

First hinge 10 and second hinge 12 are located on and attached to inner surface 26 of pipe 4 and are connected to first flap 18 and second flap 20, respectively. In one embodiment, first hinge 10 and second hinge 12 are separate components from first flap 18 and second flap 20. First hinge 10 and second hinge 12, for example, can be made of a metallic material or a plastic material. First hinge 10 and second hinge 12 can also be made of a material that is substantially resistant to hydrogen embrittlement.

First spring 14 and second spring 16 are located on inner surface 26 of pipe 4, and are connected to first flap 18 and second flap 20, respectively. In one embodiment, first spring 14 and second spring 16 are tensional springs. First spring 14 and second spring 16 can also be coil springs. First spring 14 and second spring 16 can be composed of various materials. For example, first spring 14 and second spring 16 can be made of a metallic material or a plastic material. First spring 14 and second hinge 16 can also be made of a material that is substantially resistant to hydrogen embrittlement. First spring 14 and second spring 16 can be located at various locations on first flap 18 and second flap 20 depending on the composition of the material, the yield strength, the rate of the spring, and/or the pressure generated by the gaseous fuel as it acts on first flap 18 and second flap 20. First spring 14 and second spring 16 can be utilized to hold first flap 18 and second flap 20 in a first position when pressure generated by the gaseous fuel as it acts on first flap 18 and second flap 20, respectively.

First flap 18 and second flap 20 are located in the hollow cavity of pipe 4. First flap 18 is connected to first hinge 10 and first spring 14 while second flap 20 is connected to second hinge 12 and second spring 16. First flap 18 and second flap 20 can be curved, linear, cone shaped, triangular shaped, cylindrical shaped or any other shape to allow the flow of gaseous fuel 22 when in the first position (FIG. 1) and to block the flow of gaseous fuel 22 when in the second position (FIG. 2). In one embodiment, first flap 18 and second flap 20 are made of a metallic material (e.g., a foil) or a plastic material. In another embodiment, first flap 18 and second flap 20 are made of a material that is substantially resistant to hydrogen embrittlement.

Since gaseous fuel 22 in one embodiment is hydrogen, it may be advantageous to have first flap 18 and second flap 20 be resistant to hydrogen embrittlement to reduce the likelihood of failure by first flap 18 and/or second flap 20. Furthermore, by having first flap 18 and second flap 20 be resistant to hydrogen embrittlement, it may be possible to extend the life of mechanical fuse 2.

First flap 18 and second flap 20 can also have first edge 28 and second edge 30, respectively. First edge 28 and second edge 30 can be made of a malleable material such as rubber or plastic. By having first edge 28 and second edge 30 be malleable, a better seal might be produced by first flap 18 and second flap 20 when first flap 18 and second flap 20 are in the second position since first flap 18 and second flap 20 can deform to provide a tighter seal. This can enhance the ability of first flap 18 and second flap 20 to cooperate with each other to prevent gaseous fuel 22 from flowing from first portion 6 to second portion 8 when first flap 18 and second flap 20 are in the second position. Furthermore, by having first flap 18 and second flap 20 be malleable it is contemplated that it might be relatively more efficient to produce and/or manufacture first flap 18 and second flap 20 since there can be an increase tolerance in terms of actual specification and tolerance. That is, first flap 18 and second flap 20 can be slightly different in size and shape during manufacturing and still function to prevent gaseous fuel 22 from flowing from first portion 6 to second portion 8.

In operation, pipe 4 can be connected to a first external pipe (not shown) and a second external pipe (not shown) on both ends of pipe 4 such that gaseous fuel 22 flows from first external pipe to pipe 4 to second external pipe. As seen in FIG. 1, gaseous fuel 22 flows from first portion 6 to second portion 8 within pipe 4. As gaseous fuel 22 flows from first portion 6 to second portion 8, there is a first pressure in first portion 6 and a second pressure in second portion 8.

In one embodiment, the first pressure and the second pressure can be equal or substantially equal. The first pressure, for example, can be 3 MPa and the second pressure, for example, can be 3 MPa. In another embodiment, the first pressure and the second pressure can be different. As gaseous fuel 22 flows from first portion 6 to second portion 8, gaseous fuel 22 generally flows faster in a space between first flap 18 and second flap 20 than in a space between first flap 18 and inner surface 26 and second flap 20 and inner surface 26. Since there is a speed differential between the two areas in each of first flap 18 and second flap 20, force 32 and force 34 are produced which tend to force first flap 18 and second flap 20 from the first position to the second position. However, first flap 18 and second flap 20 are restrained or held in place by first spring 14 and second spring 16, respectively. During normal operation, the first pressure and the second pressure are substantially equal (e.g., 3 MPa) and the flow over the first flap 18 and second flap 20 is within a range of flow rates. Therefore, the lift across the airfoils is below a certain threshold.

When the second external pipe ruptures, is cut, or otherwise allows gaseous fuel 22 to flow uncontrolled to an external environment, the first pressure in the first portion 6 and the second pressure in second portion 8 may drop drastically (e.g., to 0.1 MPa) even though the flow from the source is still providing gaseous fuel 22 at a pressure of 3 MPa, for example. This causes an increased flow over first flap 18 and second flap 20, and an increased lift. The increased lift causes force 32 and force 34 to increase beyond the rate or ability of first spring 14 and second spring 16 to hold first flap 18 and second flap 20 in the first position and moves first flap 18 and second flap 20 to the second position.

As seen in FIG. 2, the angle of attack of first flap 18 and second flap 20 then increases until first flap 18 and second flap 20 are in the second position and cooperate with each other to form a seal in pipe 4 which prevents gaseous fuel 22 from flowing from first portion 6 to second portion 8. In forming the seal, first edge 28 and second edge 30 of first flap 18 and second flap 20, respectively, can cooperate with each other. When first flap 18 and second flap 20 are in the second position, the second pressure produces force 36 and force 38 to act on first flap 18 and second flap 20 to maintain first flap 18 and second flap 20 in the second position until the pressure difference between the first pressure in first portion 6 and the second pressure in second portion 8 falls below the predetermined threshold. That is, after first flap 18 and second flap 20 are closed, the pressure upstream returns to 3 MPa while the pressure downstream remain at 0.1 MPa. The difference in pressure keeps the first flap 18 and the second flap 20 closed.

Thus, when an automobile (not shown) is in an accident, for example, and a pipe containing gaseous fuel 22 ruptures, gaseous fuel 22 can be safely contained through the use of mechanical fuse 2. Otherwise, gaseous fuel 22 can be expelled into the air. By preventing gaseous fuel 22 from being expelled into the air, there is a decreased likelihood that gaseous fuel 22 can affect the passengers of the automobile, rescue workers attempting to rescue the passengers, or bystanders either through harmful inhalation or an explosion. Furthermore, through the use of mechanical fuse 2, rescue workers can intentionally cut a pipe containing gaseous fuel 22 without worrying about the pipe expelling gaseous fuel 22 into the air. This can beneficially allow the rescue workers to work more efficiently in rescuing the passengers of the automobile. Since in an accident every second can be critical to the safe rescue of the passengers in the automobile, mechanical fuse 2 can beneficially reduce a rescue time of the passengers.

Furthermore, since mechanical fuse 2 does not use electricity to function, it is more reliable than electronic sensors since electrical systems in the automobile may be damaged or non-functioning due to the accident.

In one embodiment, first spring 14 and second spring 16 remain attached to first flap 18 and second flap 20 when first flap 18 and second flap 20 are in the second position. In another embodiment, first spring 14 and second spring 16 detach from first flap 18 and second flap 20 when first flap 18 and second flap 20 increase their angles of attack beyond a predetermined limit. This can beneficially allow first flap 18 and second flap 20 to more easily cooperate with each other to form a seal since the restraining force of first spring 14 and second spring 16 attempting to force first flap 18 and second flap 20 towards the first position can be eliminated.

In yet another embodiment, first spring 14 and second spring 16 detach from first flap 18 and second flap 20 when first flap 18 and second flap 20 are in the second position. Again, this can beneficially allow first flap 18 and second flap 20 to more easily cooperate with each other to form a seal.

In one embodiment, first flap 18 and second flap 20 remain in the second position even after the pressure difference drops below the predetermined threshold.

In yet another embodiment, mechanical fuse 2 is reusable after an accident. In still yet another embodiment, mechanical fuse 2 is disposable after an accident.

Although only two flaps, two springs, and two hinges are shown in the present invention, it is contemplated that any number of flaps, springs, and hinges can be attached to pipe 4 and cooperate with each other in the second position to prevent gaseous fluid 22 from flowing from first portion 6 to second portion 8.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A mechanical fuse to prevent an unexpected leakage of a gaseous fuel in an automobile comprising:
   a pipe including
      an outer wall,
      an inner wall defining a hollow cavity which allows the gaseous fuel to flow through the pipe,
      a first portion having a first pressure, and
      a second portion having a second pressure, wherein the gaseous fuel flows from the first portion to the second portion;
   a first hinge located in the hollow cavity and attached to the inner wall;
   a first spring located in the hollow cavity and attached to the inner wall; and
   a first flap located in the hollow cavity and connected to the first hinge and the first spring, the first flap including:
      a first edge comprising a malleable material, and
      a first hinged portion opposite the first edge and connected to the first hinge,
   wherein when a pressure difference between the first pressure and the second pressure is below a pressure threshold, the first spring retains the first flap in a first position allowing the gaseous fuel to flow from the first portion to the second portion and when the pressure difference between the first pressure and the second pressure is not below the pressure threshold the first flap moves to a second position preventing the gaseous fuel from flowing from the first portion to the second portion.

2. The mechanical fuse of claim 1 further comprising:
   a second hinge located in the hollow cavity and attached to the inner wall;
   a second spring located in the hollow cavity and attached to the inner wall; and
   a second flap located in the hollow cavity and connected to the second spring,
   wherein when the pressure difference between the first pressure and the second pressure is below the pressure threshold, the first spring retains the first flap in the first position and the second spring retains the second flap in the first position allowing the gaseous fuel to flow from the first portion to the second portion and when the pressure difference between the first pressure and the second pressure is not below the pressure threshold the first flap and the second flap move to the second position, the first flap and the second flap cooperate with each other to prevent the gaseous fuel from flowing from the first portion to the second portion, and the first pressure aids in maintaining the first flap and the second flap in the second position.

3. The mechanical fuse of claim 2 wherein the gaseous fuel is natural gas.

4. The mechanical fuse of claim 2 wherein the gaseous fuel is hydrogen.

5. The mechanical fuse of claim 4 wherein the first flap and the second flap comprise a material resistant to hydrogen embrittlement.

6. The mechanical fuse of claim 5 wherein the first flap and the second flap comprise a metallic material resistant to producing sparks when the first flap and the second flap cooperate with each other to prevent the gaseous fuel from flowing from the first portion to the second portion.

7. The mechanical fuse of claim 5 wherein the first flap and the second flap comprise a plastic material.

8. The mechanical fuse of claim 5 wherein the first flap and the second flap are curved.

9. The mechanical fuse of claim 8 wherein
the second flap includes a second edge, and a second hinged portion opposite the second edge and connected to the second hinge,
wherein when the pressure difference between the first pressure and the second pressure is not below the pressure threshold, the first flap rotates about the first hinged portion, the second flap rotates about the second hinged portion, and the first edge and the second edge cooperate with each other to prevent the gaseous fuel from flowing from the first portion to the second portion.

10. The mechanical fuse of claim 9 wherein the second edge comprises the malleable material.

11. The mechanical fuse of claim 10 wherein when the pressure difference between the first pressure and the second pressure is not below the pressure threshold, the first flap detaches from the first spring and the second flap detaches from the second spring.

12. A mechanical fuse to prevent an unexpected leakage of a gaseous fuel in an automobile comprising:
a pipe including
an outer wall,
an inner wall defining a hollow cavity which allows the gaseous fuel to flow through the pipe,
a first portion having a first pressure, and
a second portion having a second pressure, wherein the gaseous fuel flows from the first portion to the second portion;
a first hinge located in the hollow cavity and attached to the inner wall;
a first spring located in the hollow cavity and attached to the inner wall;
a first flap located in the hollow cavity and connected to the first hinge and the first spring, the first flap comprising
a first edge comprising a first malleable material,
a first hinged portion opposite the first edge and connected to the first hinge, and
a material resistant to hydrogen embrittlement;
a second hinge located in the hollow cavity and attached to the inner wall;
a second spring located in the hollow cavity and attached to the inner wall; and
a second flap located in the hollow cavity and connected to the second spring, the second flap comprising
a second edge comprising a second malleable material,
a second hinged portion opposite the second edge and connected to the second hinge, and
the material resistant to hydrogen embrittlement,
wherein when a pressure difference between the first pressure and the second pressure is below the pressure threshold, the first spring retains the first flap in the first position and the second spring retains the second flap in the first position allowing the gaseous fuel to flow from the first portion to the second portion and when the pressure difference between the first pressure and the second pressure is not below the pressure threshold the first flap and the second flap move to the second position, the first flap and the second flap cooperate with each other to prevent the gaseous fuel from flowing from the first portion to the second portion, and the first pressure aids in maintaining the first flap and the second flap in the second position.

13. The mechanical fuse of claim 12 wherein the gaseous fuel is natural gas.

14. The mechanical fuse of claim 12 wherein the gaseous fuel is hydrogen.

15. The mechanical fuse of claim 14 wherein the first flap and the second flap comprise a metallic material resistant to producing sparks when the first flap and the second flap cooperate with each other to prevent the gaseous fuel from flowing from the first portion to the second portion.

16. The mechanical fuse of claim 15 wherein the first flap and the second flap comprise a plastic material.

17. The mechanical fuse of claim 16 wherein the first flap and the second flap are curved.

18. The mechanical fuse of claim 17 wherein
when the pressure difference between the first pressure and the second pressure is not below the pressure threshold, the first flap rotates about the first hinged portion, the second flap rotates about the second hinged portion, and the first edge and the second edge cooperate with each other to prevent the gaseous fuel from flowing from the first portion to the second portion.

19. The mechanical fuse of claim 18 wherein when the pressure difference between the first pressure and the second pressure is not below the pressure threshold, the first flap detaches from the first spring and the second flap detaches from the second spring.

* * * * *